United States Patent
Smith et al.

(10) Patent No.: US 11,471,832 B1
(45) Date of Patent: Oct. 18, 2022

(54) SOLID AMINE COMBINED CARBON DIOXIDE SEPARATION PROCESS

(71) Applicant: Hamilton Sundstrand Corporation, Charlotte, NC (US)

(72) Inventors: Kenneth David Smith, East Longmeadow, MA (US); Haralambos Cordatos, Colchester, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/392,980

(22) Filed: Aug. 3, 2021

(51) Int. Cl.
*B01D 19/00* (2006.01)
*B01D 53/34* (2006.01)
*B01D 53/62* (2006.01)
*B01D 53/82* (2006.01)
*B01D 53/96* (2006.01)

(52) U.S. Cl.
CPC ......... *B01D 53/96* (2013.01); *B01D 19/0036* (2013.01); *B01D 53/346* (2013.01); *B01D 53/62* (2013.01); *B01D 53/82* (2013.01); *B01D 2253/20* (2013.01); *B01D 2257/504* (2013.01)

(58) Field of Classification Search
CPC ........ B01D 53/96; B01D 53/62; B01D 53/82; B01D 19/0036; B01D 53/346; B01D 2257/504; B01D 2253/20
See application file for complete search history.

(56) References Cited

U.S. PATENT DOCUMENTS

| | | | |
|---|---|---|---|
| 8,377,173 B2 | 2/2013 | Chuang | |
| 9,474,999 B2 | 10/2016 | Fan | |
| 2005/0199124 A1* | 9/2005 | Little | B01J 20/265 96/121 |
| 2015/0231561 A1* | 8/2015 | Reardon | B01D 53/84 435/266 |
| 2017/0096335 A1* | 4/2017 | Wormser | B01D 53/047 |
| 2020/0001231 A1* | 1/2020 | Thompson | B01D 53/18 |

FOREIGN PATENT DOCUMENTS

WO  WO 2017 169 669 A1 * 10/2017 ............. B01J 20/28
WO  WO 2020 055 527 A1 *  3/2020 ............. B01J 20/26

* cited by examiner

*Primary Examiner* — Timothy C Vanoy
(74) *Attorney, Agent, or Firm* — Cantor Colburn LLP (57) ABSTRACT

A swing bed absorption apparatus including a first absorption bed including a first plurality of solid amine based sorbent beads, a second absorption bed including a second plurality of solid amine based sorbent beads, and a solvent pump configured to alternately pump a liquid solvent through the first absorption bed and the second absorption bed. The liquid solvent is configured to alternately desorb the carbon dioxide from the first plurality of solid amine based sorbent beads and the second plurality of solid amine based sorbent beads.

20 Claims, 2 Drawing Sheets

SOLID AMINE COMBINED CARBON DIOXIDE SEPARATION PROCESS

BACKGROUND

The subject matter disclosed herein relates generally to the field of removing carbon dioxide gas, and specifically to an apparatus for absorbing and removing carbon dioxide gas and humidity from an enclosed space.

Life support systems that are utilized in enclosed spaces such as submarines, spacecraft or space suits require the continuous removal of carbon dioxide. A regenerative carbon dioxide removal system is utilized for this purpose and commonly includes amine beds that are placed in contact with a flow of carbon dioxide laden air. The amine beds adsorb carbon dioxide from the air stream through chemical processes and reactions.

An amine bed is utilized until it is saturated to a selected saturation level. The selected saturation level can be a saturation level where the amine bed can no longer efficiently remove carbon dioxide from an air stream or any saturation level less than the saturation level where the amine bed can no longer efficiently remove carbon dioxide from the air stream. Another amine bed is then switched into contact with the carbon dioxide laden air stream. The saturated amine bed is then desorbed to expel carbon dioxide in preparation for the next cycle.

BRIEF SUMMARY

According to one embodiment, a swing bed absorption apparatus is provided. The swing bed absorption apparatus including a first absorption bed including a first plurality of solid amine based sorbent beads, a second absorption bed including a second plurality of solid amine based sorbent beads, and a solvent pump configured to alternately pump a liquid solvent through the first absorption bed and the second absorption bed. The liquid solvent is configured to alternately desorb the carbon dioxide from the first plurality of solid amine based sorbent beads and the second plurality of solid amine based sorbent beads.

In addition to one or more of the features described above, or as an alternative, further embodiments may include a drum inlet passage to receive the liquid solvent from the first absorption bed and the second absorption bed.

In addition to one or more of the features described above, or as an alternative, further embodiments may include a drum inlet passage, and a flash drum fluidly connected to the drum inlet passage, the flash drum being configured to receive the liquid solvent from the drum inlet passage. The flash drum is configured to separate the liquid solvent in a liquid form and the carbon dioxide in a gaseous form.

In addition to one or more of the features described above, or as an alternative, further embodiments may include a carbon dioxide blower. The flash drum further includes: a top and a bottom opposite the top, a flash drum gas exit passage fluidly connecting the top of the flash drum to the carbon dioxide blower. The carbon dioxide blower is configured to remove the carbon dioxide from the flash drum. The flash drum further includes a flash drum liquid exit passageway fluidly connected to the bottom of the flash drum. The flash drum liquid exit passageway configured to provide the liquid solvent to the solvent pump.

In addition to one or more of the features described above, or as an alternative, further embodiments may include a first three-way valve configured to switch between a first absorption bed position and a second absorption bed position, a second three-way valve configured to switch between a first absorption bed absorption position and a first absorption bed desorption position, and a third three-way valve configured to switch between a second absorption bed absorption position and a second absorption bed desorption position. The first three-way valve is configured to fluidly connect a carbon dioxide laden airstream to the second three-way valve in the first absorption bed position. The first three-way valve is configured to fluidly connect the carbon dioxide laden airstream to the third three-way valve in the second absorption bed position.

In addition to one or more of the features described above, or as an alternative, further embodiments may include that the second three-way valve is configured to fluidly connect the first three-way valve to the first absorption bed in the first absorption bed absorption position. The second three-way valve is configured to fluidly connect the first absorption bed to the drum inlet passage in the first absorption bed desorption position.

In addition to one or more of the features described above, or as an alternative, further embodiments may include that the third three-way valve is configured to fluidly connect the first three-way valve to the second absorption bed in the second absorption bed absorption position. The third three-way valve is configured to fluidly connect the second absorption bed to the drum inlet passage in the second absorption bed desorption position.

In addition to one or more of the features described above, or as an alternative, further embodiments may include a fourth three-way valve configured to switch between a first absorption bed solvent side position and a second absorption bed solvent side position, a fifth three-way valve configured to switch between a first absorption bed absorption solvent side position and a first absorption bed desorption solvent side position, and a sixth three-way valve configured to switch between a second absorption bed absorption solvent side position and a second absorption bed desorption solvent side position. The fourth three-way valve is configured to fluidly connect the solvent pump to the fifth three-way valve in the first absorption bed solvent side position. The fourth three-way valve is configured to fluidly connect the solvent pump to the sixth three-way valve in the second absorption bed solvent side position.

In addition to one or more of the features described above, or as an alternative, further embodiments may include that the fifth three-way valve is configured to fluidly connect a purified stream blower to the first absorption bed in the first absorption bed absorption solvent side position. The fifth three-way valve is configured to fluidly connect the first absorption bed to the fourth three-way valve in the first absorption bed desorption solvent side position.

In addition to one or more of the features described above, or as an alternative, further embodiments may include that the sixth three-way valve is configured to fluidly connect a purified stream blower to the second absorption bed in the second absorption bed absorption solvent side position. The sixth three-way valve is configured to fluidly connect the second absorption bed to the fourth three-way valve in the second absorption bed desorption solvent side position.

In addition to one or more of the features described above, or as an alternative, further embodiments may include that the liquid solvent has a solubility for the carbon dioxide equal to or greater than 3.6 liters of the carbon dioxide per liter of the liquid solvent (0.95 gallons of the carbon dioxide per gallon of the liquid solvent).

In addition to one or more of the features described above, or as an alternative, further embodiments may include that the liquid solvent is dimethyl ether of polyethylene glycol.

According to another embodiment, a method of removing carbon dioxide from a carbon dioxide laden airstream is provided. The method includes flowing the carbon dioxide laden airstream through a first absorption bed including a first plurality of solid amine based sorbent beads configured to absorb the carbon dioxide from the carbon dioxide laden airstream, ceasing flow of the carbon dioxide laden airstream through the first absorption bed, and flowing liquid solvent through the first absorption bed when flow of the carbon dioxide laden airstream through the first absorption bed has ceased. The liquid solvent is configured to desorb the carbon dioxide from the first plurality of solid amine based sorbent beads.

In addition to one or more of the features described above, or as an alternative, further embodiments may include flowing the carbon dioxide laden airstream through a second absorption bed when flow of the carbon dioxide laden airstream through the first absorption bed has ceased. The second absorption bed including a second plurality of solid amine based sorbent beads configured to absorb the carbon dioxide from the carbon dioxide laden airstream.

In addition to one or more of the features described above, or as an alternative, further embodiments may include ceasing flow of the liquid solvent through the first absorption bed, ceasing flow of the carbon dioxide laden airstream through the second absorption bed when flow of the liquid solvent through the first absorption bed has ceased, and flowing liquid solvent through the second absorption bed when the flow of the carbon dioxide laden airstream through the second absorption bed has ceased. The liquid solvent is configured to desorb the carbon dioxide from the second plurality of solid amine based sorbent beads.

In addition to one or more of the features described above, or as an alternative, further embodiments may include flowing the carbon dioxide laden airstream through the first absorption bed when flow of the liquid solvent through the first absorption bed has ceased and when the flow of the carbon dioxide laden airstream through the second absorption bed has ceased.

In addition to one or more of the features described above, or as an alternative, further embodiments may include separating the carbon dioxide from the liquid solvent using a flash drum and removing the carbon dioxide from the flash drum.

In addition to one or more of the features described above, or as an alternative, further embodiments may include that the liquid solvent has a solubility for the carbon dioxide equal to or greater than 2 liters of the carbon dioxide per liter of the liquid solvent (0.52 gallons of the carbon dioxide per gallon of the liquid solvent).

In addition to one or more of the features described above, or as an alternative, further embodiments may include that the liquid solvent is dimethyl ether of polyethylene glycol.

According to another embodiment, a computer program product tangibly embodied on a non-transitory computer readable medium is provided. The computer program product including instructions that, when executed by a processor, cause the processor to perform operations including controlling one or more valves to a flow a carbon dioxide laden airstream through a first absorption bed including a first plurality of solid amine based sorbent beads configured to absorb carbon dioxide from the carbon dioxide laden airstream, controlling the one or more valves to cease the flow of the carbon dioxide laden airstream through the first absorption bed, and controlling another one or more valves to flow liquid solvent through the first absorption bed when the flow of the carbon dioxide laden airstream through the first absorption bed has ceased. The liquid solvent is configured to desorb the carbon dioxide from the first plurality of solid amine based sorbent beads.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

An amine bed for a swing bed absorption apparatus is typically filled with amine-based sorbent beads that adsorb carbon dioxide from the air stream through chemical processes and reactions. An amine bed is utilized until it is saturated to a selected saturation level. The selected saturation level can be a saturation level where the amine bed can no longer efficiently remove carbon dioxide from an air stream or any saturation level less than the saturation level where the amine bed can no longer efficiently remove carbon dioxide from the air stream, for example. Another amine bed is then switched into contact with the carbon dioxide laden air stream. The saturated amine bed is then desorbed to expel carbon dioxide in preparation for the next cycle.

Conventionally, the desorption process requires a vacuum and a great deal of time to remove the carbon dioxide from the amine-based sorbent beads. Conventional swing bed absorption apparatus are typically utilized in space to remove carbon dioxide in environments for astronauts. Since space is a vacuum, the vacuum of space is conventionally used for the desorption process. However, for terrestrial application, such as on earth, vacuums are not plentiful. The embodiments disclosed herein seek to provide apparatus and methods for absorbing and removing carbon dioxide gas and humidity from an enclosed space without the aid of the vacuum of space. The embodiments disclosed herein utilize a multiple-bed swing absorption process with at least two absorption beds each containing solid amine based sorbent beads. While one absorption bed is absorbing the other absorption bed is desorbing. If the absorption process is faster than the desorption process, multiple beds can be desorbing while one bed is actively absorbing. This allows for continuous operation and process that is scalable. The solid amine based sorbent beads absorb carbon dioxide directly from the gas phase without additional liquid solvents. The desorption process disclosed herein uses a liquid solvent having high carbon dioxide solubility to facilitate the process with pressurization via pumping required for the final flash separation to obtain the purified carbon dioxide stream. A high carbon dioxide solubility may be defined as a solubility for carbon dioxide 204 equal to or greater than 3 volumes of the carbon dioxide 204 per one volume of liquid solvent 202 at ambient temperature and pressure.

Figure 1:
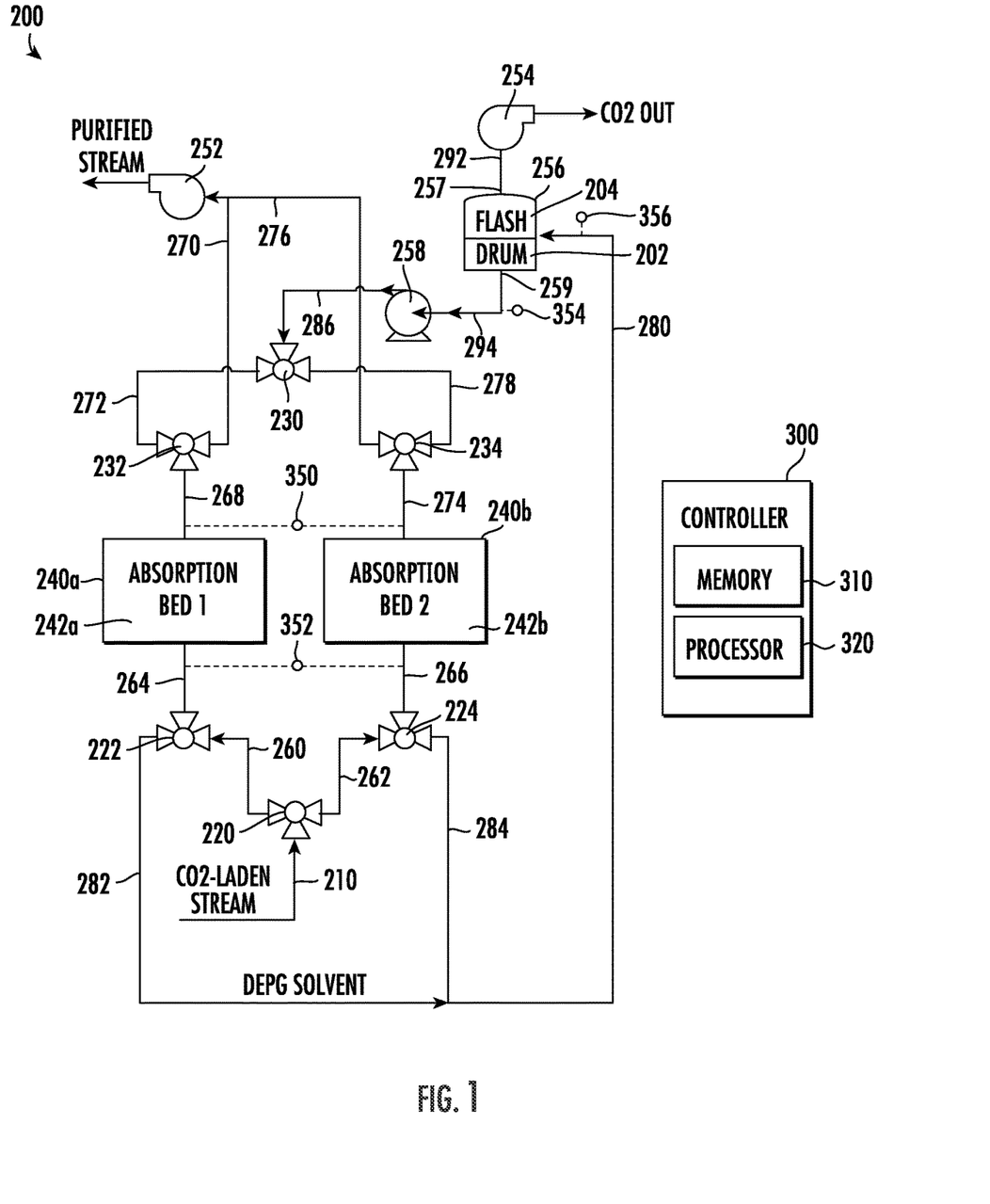
FIG. 1 illustrates a schematic view of a swing bed absorption apparatus, according to an embodiment of the present disclosure.

Referring now to FIG. 1, a schematic view of a swing bed absorption apparatus 200 is illustrated, according to an embodiment of the present disclosure. The exemplary swing bed absorption apparatus 200 is composed of a first absorption bed 240a and a second absorption bed 240b (generally referred to as 240). The first absorption bed 240a includes a first plurality of solid amine based sorbent beads 242a and the second absorption bed 240b includes a second plurality of solid amine based sorbent beads 242b. It is understood that while the exemplary swing bed absorption apparatus 200 of FIG. 1 includes two absorption beds 240a, 240b, the embodiments disclosed herein may be applicable to a swing bed absorption apparatus 200 with more than two absorption beds 240.

The swing bed absorption apparatus 200 is configured to flow carbon dioxide laden airstream 210 through the first absorption bed 240a until the solid amine based sorbent beads 242a of first absorption bed 240a reach a selected saturation level and then the swing bed absorption apparatus 200 is configured to flow carbon dioxide laden airstream 210 through the second absorption bed 240b while desorbing the carbon dioxide 204 from the first plurality of solid amine based sorbent beads 242a of the first absorption bed 240a using a liquid solvent 202. In an embodiment, the liquid solvent 202 may be a high soluble desorption liquid solvent. In an embodiment, the liquid solvent 202 may be dimethyl ether of polyethylene glycol (DEPG) (i.e., Selexol). In an embodiment, the liquid solvent 202 has a solubility for carbon dioxide 204 equal to or greater than 2 liters of the carbon dioxide 204 per liter of liquid solvent 202 (0.52 gallons of the carbon dioxide 204 per gallon of liquid solvent 202). This solubility may be measured at a pressure of 1 bar (14.50 psi) and a temperature of 0° C. (32° F.). In another embodiment, the liquid solvent 202 has a solubility for carbon dioxide 204 equal to or greater than 3.6 liters of the carbon dioxide 204 per liter of liquid solvent 202 (0.95 gallons of the carbon dioxide 204 per gallon of liquid solvent 202). This solubility may be measured at a pressure of 1 bar (14.50 psi) and a temperature of 0° C. (32° F.). Once the liquid solvent 202 is saturated with the carbon dioxide 204 from the solid amine based sorbent beads 242a or 242b, the saturated liquid solvent 202 is passed through a flash drum 256 where it can be separated into a purified stream of carbon dioxide 204 and then the liquid solvent 202 is recycled for continued desorption of carbon dioxide 204. Advantageously, the use of liquid solvents 202 is both easier and more energy efficient to increase pressure for the flash separation comparted to using gas streams.

The swing bed absorption apparatus 200 includes a first three-way valve 220, a second three-way valve 222, a third three-way valve 224, a fourth three-way valve 230, a fifth three-way valve 232, a sixth three-way valve 234, a purified stream blower 252, a carbon dioxide blower 254, the flash drum 256, and a solvent pump 258. It is understood that a solvent expander may be required in the swing bed absorption apparatus 200 if there is not a sufficient pressure reduction effect on the liquid solvent 202 from flowing through the absorption beds, 240a, 240b alone. The solvent expander may exist between the absorption beds 240a, 240b and the flash drum 256.

The first three-way valve 220 fluidly connects the swing bed absorption apparatus 200 to a carbon dioxide laden airstream 210. The first three-way valve 220 is configured to switch between a first absorption bed position, ultimately leading to the first absorption bed 240a and a second absorption bed position, ultimately leading to the second absorption bed 240b. In the first absorption bed position, the first three-way valve 220 is configured to fluidly connect the carbon dioxide laden airstream 210 to the second three-way valve 222. In other words, in the first absorption bed position, the first three-way valve 220 is configured to fluidly connect the carbon dioxide laden airstream 210 to a first absorption bed connector passage 260. The first absorption bed connector passage 260 fluidly connects the first three-way valve 220 to the second three-way valve 222. In the first absorption bed position, the carbon dioxide laden airstream 210 is configured to flow through the first three-way valve 220 to the second three-way valve 222.

In the second absorption bed position, the first three-way valve 220 is configured to fluidly connect the carbon dioxide laden airstream 210 to the third three-way valve 224. In other words, in the second absorption bed position, the first three-way valve 220 is configured to fluidly connect the carbon dioxide laden airstream 210 to a second absorption bed connector passage 262. The second absorption bed connector passage 262 fluidly connects the first three-way valve 220 to the third three-way valve 224. In the second absorption bed position, the carbon dioxide laden airstream 210 is configured to flow through the first three-way valve 220 to the third three-way valve 224.

The second three-way valve 222 is configured to switch between a first absorption bed absorption position and a first absorption bed desorption position. In the first absorption bed absorption position, the second three-way valve 222 is configured to fluidly connect the first three-way valve 220 to the first absorption bed 240a. In other words, in the first absorption bed absorption position, the second three-way valve 222 is configured to fluidly connect the first absorption bed connector passage 260 to a first absorption bed inlet passage 264. The first absorption bed inlet passage 264 fluidly connects the second three-way valve 222 to the first absorption bed 240a. In the first absorption bed absorption position, the carbon dioxide laden airstream 210 is configured to flow from the first three-way valve 220 through the second three-way valve 222 to the first absorption bed 240a.

In the first absorption bed desorption position, the second three-way valve 222 is configured to fluidly connect the first absorption bed 240a to a drum inlet passage 280. In other words, in the first absorption bed desorption position, the second three-way valve 222 is configured to fluidly connect the first absorption bed inlet passage 264 to a first solvent passage 282. The first solvent passage 282 fluidly connects the second three-way valve 222 to the drum inlet passage 280. In the first absorption bed desorption position, liquid solvent 202 is configured to flow from the first absorption bed 240a through the second three-way valve 222 to the drum inlet passage 280. The drum inlet passage 280 is configured to receive the liquid solvent 202 from the first absorption bed 240a and the second absorption bed 240b.

The third three-way valve 224 is configured to switch between a second absorption bed absorption position and a second absorption bed desorption position. In the second absorption bed absorption position, the third three-way valve 224 is configured to fluidly connect the first three-way valve 220 to the second absorption bed 240b. In other words, in the second absorption bed absorption position, the third three-way valve 224 is configured to fluidly connect the second absorption bed connector passage 262 to a second absorption bed inlet passage 266. The second absorption bed inlet passage 266 fluidly connects the third three-way valve 224 to the second absorption bed 240b. In the second absorption bed absorption position, the carbon dioxide laden airstream 210 is configured to flow from the first three-way valve 220 through the third three-way valve 224 to the second absorption bed 240b.

In the second absorption bed desorption position, the third three-way valve 224 is configured to fluidly connect the second absorption bed 240b to the drum inlet passage 280. In other words, in the second absorption bed desorption position, the third three-way valve 224 is configured to fluidly connect the second absorption bed inlet passage 266 to a second solvent passage 284. The second solvent passage 284 fluidly connects the third three-way valve 224 to the drum inlet passage 280. In the second absorption bed desorption position, liquid solvent 202 is configured to flow from second absorption bed 240b through the third three-way valve 224 to the drum inlet passage 280.

The liquid solvent 202 is configured to absorb the carbon dioxide 204 from the solid amine based sorbent beads 242a, 242b in the first absorption bed 240a and the second absorption bed 240b. The liquid solvent 202 is transported to the flash drum 256 with the carbon dioxide 204. The flash drum 256 is configured to expand the liquid solvent 202, thus reducing the pressure of the liquid solvent 202. The flash drum 256 is configured to separate the liquid solvent 202 in a liquid form and the carbon dioxide 204 in a gaseous form. The carbon dioxide 204 in the gaseous form will rise to a top 257 of the flash drum 256 and exit the flash drum 256 through a flash drum gas exit passage 292. A bottom 259 of the flash drum 256 is located opposite the top 257. The flash drum gas exit passage 292 fluidly connects the top 257 of the flash drum 256 to the carbon dioxide blower 254. The carbon dioxide blower 254 is configured to remove the carbon dioxide 204 from the flash drum 256. The liquid solvent 202 in liquid form will fall to the bottom 259 of the flash drum 256 and exit the flash drum 256 through a flash drum liquid exit passageway 294. The flash drum liquid exit passageway 294 is fluidly connected to the bottom 259 of the flash drum 256. The flash drum liquid exit passageway 294 fluidly connects the flash drum 256 to the solvent pump 258. The flash drum liquid exit passageway 294 is configured to provide the liquid solvent 202 back to the solvent pump 258 after the carbon dioxide 204 has been removed in the flash drum 256.

The solvent pump 258 is fluidly connected to the fourth three-way valve 230 through a solvent entry passageway 286. The solvent pump 258 is configured to alternately pump the liquid solvent 202 through the first absorption bed 240a and the second absorption bed 240b. Further, the solvent pump 258 is configured to pump the liquid solvent 202 through the first absorption bed 240a and the second absorption bed 240b in an alternating sequence, such that liquid solvent 202 may only be pumped through one of the first absorption bed 240a and the second absorption bed 240b at any given time but never both at the same time. The liquid solvent 202 is configured to alternately desorb the carbon dioxide 204 from the first plurality of solid amine based sorbent beads 242a and the second plurality of solid amine based sorbent beads 242b.

The fifth three-way valve 232 is configured to switch between a first absorption bed absorption solvent side position and a first absorption bed desorption solvent side position. In the first absorption bed absorption solvent side position, the fifth three-way valve 232 is configured to fluidly connect the purified stream blower 252 to the first absorption bed 240a. In other words, in the first absorption bed absorption solvent side position, the fifth three-way valve 232 is configured to fluidly connect a first absorption bed outlet passage 268 to a first absorption bed purified stream passage 270. The first absorption bed outlet passage 268 fluidly connects the fifth three-way valve 232 to the first absorption bed 240a. The first absorption bed purified stream passage 270 fluidly connects the fifth three-way valve 232 to the purified stream blower 252. In the first absorption bed absorption solvent side position, purified air that is free of carbon dioxide 204 is configured to flow from the first absorption bed 240a through the fifth three-way valve 232 to the purified stream blower 252. The purified stream blower 252 is configured to deliver the purified air to collection area where it may be compressed for utilization or sequestration In the first absorption bed desorption solvent side position, the fifth three-way valve 232 is configured to fluidly connect the first absorption bed 240a to the fourth three-way valve 230. In other words, in the first absorption bed desorption solvent side position, the fifth three-way valve 232 is configured to fluidly connect the first absorption bed outlet passage 268 to a first absorption bed solvent connector passage 272. The first absorption bed solvent connector passage 272 fluidly connects the fifth three-way valve 232 to the fourth three-way valve 230. In the first absorption bed desorption solvent side position, liquid solvent 202 is configured to flow from fourth three-way valve 230 through the fifth three-way valve 232 to the first absorption bed 240a.

The sixth three-way valve 234 is configured to switch between a second absorption bed absorption solvent side position and a second absorption bed desorption solvent side position. In the second absorption bed absorption solvent side position, the sixth three-way valve 234 is configured to fluidly connect the purified stream blower to the second absorption bed 240b. In other words, in the second absorption bed absorption solvent side position, the sixth three-way valve 234 is configured to fluidly connect a second absorption bed outlet passage 274 to a second absorption bed purified stream passage 276. The second absorption bed outlet passage 274 fluidly connects the sixth three-way valve 234 to the second absorption bed 240b. The second absorption bed purified stream passage 276 fluidly connects the sixth three-way valve 234 to the purified stream blower 252. In the second absorption bed absorption solvent side position, purified air that is free of carbon dioxide 204 is configured to flow from the second absorption bed 240b through the sixth three-way valve 234 to the purified stream blower 252.

In the second absorption bed desorption solvent side position, the sixth three-way valve 234 is configured to fluidly connect the second absorption bed 240b to the fourth three-way valve 230. In other words, in the second absorption bed desorption solvent side position, the sixth three-way valve 234 is configured to fluidly connect the second absorption bed outlet passage 274 to a second absorption bed solvent connector passage 278. The second absorption bed solvent connector passage 278 fluidly connects the sixth three-way valve 234 to the fourth three-way valve 230. In the second absorption bed desorption solvent side position, liquid solvent 202 is configured to flow from fourth three-way valve 230 through the sixth three-way valve 234 to the second absorption bed 240b.

The fourth three-way valve 230 is fluidly connected to the solvent pump 258 and is configured to deliver liquid solvent 202 from the solvent pump 258 to at least one of the first absorption bed 240a and the second absorption bed 240b. The fourth three-way valve 230 is configured to switch between a first absorption bed solvent side position and a second absorption bed solvent side position. In the first absorption bed solvent side position, the fourth three-way valve 230 is configured to fluidly connect the solvent pump 258 to the fifth three-way valve 232. In other words, in the first absorption bed solvent side position, the fourth three-way valve 230 is configured to fluidly connect the solvent pump 258 to the first absorption bed solvent connector passage 272. In the first absorption bed solvent side position, liquid solvent 202 is configured to flow from the solvent pump 258 through the fourth three-way valve 230 to the fifth three-way valve 232.

In the second absorption bed solvent side position, the fourth three-way valve 230 is configured to fluidly connect the solvent pump 258 to the sixth three-way valve 234. In other words, in the second absorption bed solvent side position, the fourth three-way valve 230 is configured to fluidly connect the solvent pump 258 to a second absorption bed solvent connector passage 278. The second absorption bed solvent connector passage 278 fluidly connects the fourth three-way valve 230 to the sixth three-way valve 234. In the second absorption bed solvent side position, liquid solvent 202 is configured to flow from the solvent pump 258 through the fourth three-way valve to the sixth three-way valve 234.

The swing bed absorption apparatus 200 may also include a controller 300 configured to control positions of the three-ways valves 220, 222, 224, 230, 232, 234. The controller 300 may also be configured to control operation of the solvent pump 258, the purified stream blower 252, and the carbon dioxide blower 254. The controller 300 may be an electronic controller including a processor 320 and an associated memory 310 comprising computer-executable instructions (i.e., computer program product) that, when executed by the processor 320, cause the processor to perform various operations. The processor 320 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 310 may be but is not limited to a random access memory (RAM), read only memory (ROM), or other electronic, optical, magnetic or any other computer readable medium.

When the first absorption bed 240a is absorbing the controller 300 is configured to adjust the first three-way valve 220 to the first absorption bed position, adjust the second three-way valve 222 to the first absorption bed absorption position, and adjust the fifth three-way valve 232 to the first absorption bed absorption solvent side position.

The second absorption bed 240b may be desorbing when the first absorption bed 240a is absorbing. When the second absorption bed 240b is desorbing the controller 300 is configured to adjust the fourth three-way valve 230 to the second absorption bed solvent side position, adjust the sixth three-way valve 234 to the second absorption bed desorption solvent side position, and adjust the third three-way valve 224 to the second absorption bed desorption position.

When the second absorption bed 240b is absorbing the controller 300 is configured to adjust the first three-way valve 220 to the second absorption bed position, adjust the third three-way valve 224 to the second absorption bed absorption position, and adjust the sixth three-way valve 234 to the second absorption bed absorption solvent side position.

The first absorption bed 240a may be desorbing when the second absorption bed 240b is absorbing. When the first absorption bed 240a is desorbing the controller 300 is configured to adjust the fourth three-way valve 230 to the first absorption bed solvent side position, adjust the fifth three-way valve 232 to the first absorption bed desorption solvent side position, and adjust the second three-way valve 222 to the first absorption bed desorption position.

The controller 300 may be in communication with one or more sensors 350, 352, 354, 356 to help monitor and control the swing bed absorption apparatus 200.

A first sensor 350 may be located in or connected to the first absorption bed outlet passage 268 and the second absorption bed outlet passage 274 to monitor any changes the concentration of carbon dioxide 204, which helps the controller 300 control bed switching based on a current saturation level of the absorption beds 240a, 240b. If the first sensor 350 begins detecting carbon dioxide in the first absorption bed outlet passage 268 during the absorption process of the first absorption bed 240a then it may mean that the first absorption bed 240a is fully saturated. If the first sensor 350 begins detecting carbon dioxide 204 in the second absorption bed outlet passage 274 during the absorption process of the second absorption bed 240b then it may mean that that second absorption bed 240b is fully saturated.

A second sensor 252 may be located in or connected to the first absorption bed inlet passage 264 and the second absorption bed inlet passage 266 to monitor any changes in the concentration of carbon dioxide 204, which helps the controller 300 control bed switching based on a current desorption level of the absorption beds 240a, 240b.

If the second sensor 252 begins detecting no carbon dioxide 204 in the first absorption bed inlet passage 264 during desorption process of the first absorption bed 240a then it may be that the first absorption bed 240a is fully desaturated. If the second sensor 252 begins detecting no carbon dioxide 204 in the second absorption bed inlet passage 266 during the desorption process of the second absorption bed 240b then it may mean that that second absorption bed 242b is fully desaturated.

A third sensor 254 may be located in or connected to the flash drum liquid exit passageway 294 to ensure purity (e.g., no carbon dioxide 204) in the solvent 202 upon exiting the flash drum 256.

A fourth sensor 256 may be located in or connected to the inlet of the flash drum 256 to detect the concentration of carbon dioxide 204 in the solvent 202 to see if there is too much carbon dioxide 204 in the solvent 202, which may lead to a degradation of the ability of the solvent 202 to desorb.

Figure 2:
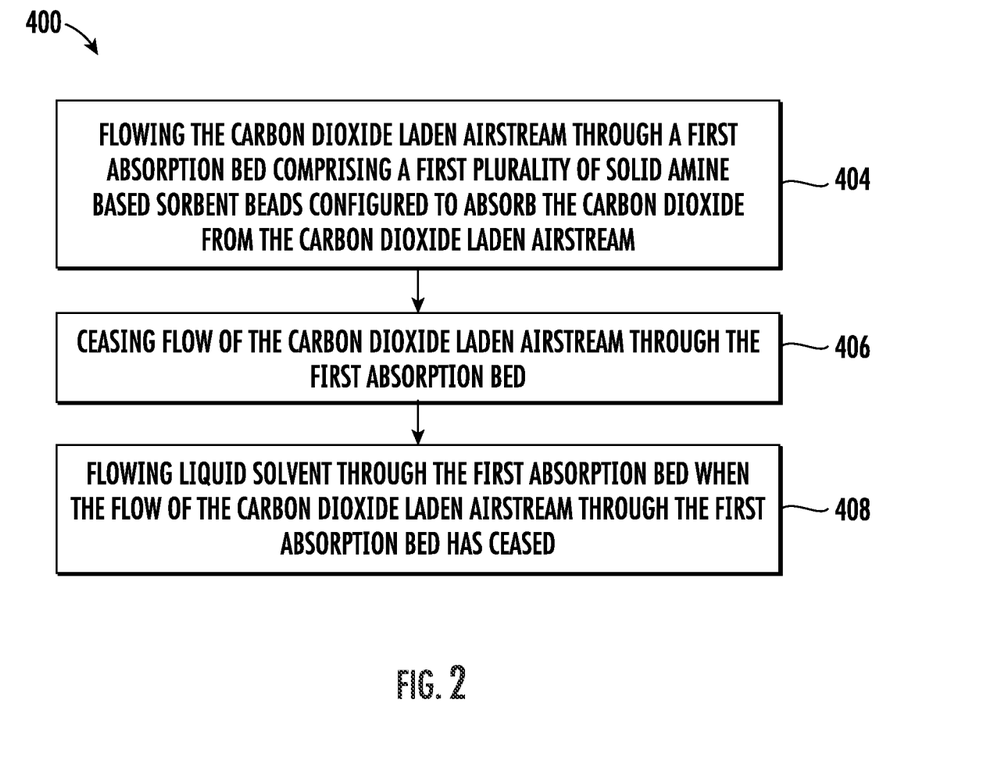
FIG. 2 illustrates a flow chart of a method of removing carbon dioxide from a carbon dioxide laden airstream, in accordance with an embodiment of the present disclosure.

Referring now to FIG. 2, with continued reference to FIG. 1, a flow chart of method 400 of removing carbon dioxide 204 from a carbon dioxide laden airstream 210 is illustrated, in accordance with an embodiment of the disclosure. The method 400 may be performed by the swing bed absorption apparatus 200 and controlled by the controller 300.

At block 404, the carbon dioxide laden airstream 210 is flowed through a first absorption bed 240a comprising a first plurality of solid amine based sorbent beads 242a configured to absorb carbon dioxide 204 from the carbon dioxide laden airstream 210.

At block 406, the flow of the carbon dioxide laden airstream 210 through the first absorption bed 240a is ceased.

At block 408, liquid solvent 202 is flowed through the first absorption bed 240a when the flow of the carbon dioxide laden airstream 210 through the first absorption bed 240a has ceased. The liquid solvent 202 is configured to desorb the carbon dioxide 204 from the first plurality of solid amine based sorbent beads 242a.

Following block 408, the method 400 may include additional iterations involving the second absorption bed 240b in turn. For example, in a next iteration, the carbon dioxide laden airstream 210 is flowed through a second absorption bed 240b when the flow of the carbon dioxide laden airstream 210 through the first absorption bed 240a has ceased. The second absorption bed 240b comprising a second plurality of solid amine based sorbent beads 242b is configured to absorb carbon dioxide 204 from the carbon dioxide laden airstream 210.

Next, the flow of the liquid solvent 202 through the first absorption bed 240a may be ceased and then the flow of the carbon dioxide laden airstream 210 through the second absorption bed 240b may be ceased when flow of the liquid solvent 202 through the first absorption bed 240a has ceased. Then liquid solvent 202 may be flowed through the second absorption bed 240b when the flow of the carbon dioxide laden airstream 210 through the second absorption bed 240b has ceased. The liquid solvent 202 is configured to desorb the carbon dioxide 204 from the second plurality of solid amine based sorbent beads 242b. The method 400 may then include that the carbon dioxide laden airstream 210 is flowed through the first absorption bed 240a when flow of the liquid solvent 202 through the first absorption bed 240a has ceased and when the flow of the carbon dioxide laden airstream 210 through the second absorption bed 240b has ceased.

The method 400 may also include separating the carbon dioxide 204 from the liquid solvent 202 using a flash drum 256 and removing the carbon dioxide 204 from the flash drum 256.

Technical effects and benefits of the features described herein include a swing bed comprising two absorption beds and alternating the flow of carbon dioxide laden airflow with a liquid solvent through each absorption bed.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

As described above, embodiments can be in the form of processor-implemented processes and devices for practicing those processes, such as processor. Embodiments can also be in the form of computer program code (e.g., computer program product) containing instructions embodied in tangible media (e.g., non-transitory computer readable medium), such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an device for practicing the exemplary embodiments. When implemented on a general-purpose microprocessor, the computer program code segments configure the microprocessor to create specific logic circuits.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A swing bed absorption apparatus, comprising:
   a first absorption bed comprising a first plurality of solid amine based sorbent beads;
   a second absorption bed comprising a second plurality of solid amine based sorbent beads; and
   a solvent pump configured to alternately pump a liquid solvent through the first absorption bed and the second absorption bed,
   wherein the liquid solvent is configured to alternately desorb the carbon dioxide from the first plurality of solid amine based sorbent beads and the second plurality of solid amine based sorbent beads.

2. The swing bed absorption apparatus of claim 1, further comprising:
   a drum inlet passage to receive the liquid solvent from the first absorption bed and the second absorption bed.

3. The swing bed absorption apparatus of claim 2, further comprising:
   a drum inlet passage; and
   a flash drum fluidly connected to the drum inlet passage, the flash drum being configured to receive the liquid solvent from the drum inlet passage,
   wherein the flash drum is configured to separate the liquid solvent in a liquid form and the carbon dioxide in a gaseous form.

4. The swing bed absorption apparatus of claim 3, further comprising:
   a carbon dioxide blower, wherein the flash drum further comprises: a top and a bottom opposite the top;
   a flash drum gas exit passage fluidly connecting the top of the flash drum to the carbon dioxide blower, wherein the carbon dioxide blower is configured to remove the carbon dioxide from the flash drum; and a flash drum liquid exit passageway fluidly connected to the bottom of the flash drum, the flash drum liquid exit passageway configured to provide the liquid solvent to the solvent pump.

5. The swing bed absorption apparatus of claim 4, further comprising:
a first three-way valve configured to switch between a first absorption bed position and a second absorption bed position;
a second three-way valve configured to switch between a first absorption bed absorption position and a first absorption bed desorption position; and
a third three-way valve configured to switch between a second absorption bed absorption position and a second absorption bed desorption position,
wherein the first three-way valve is configured to fluidly connect a carbon dioxide laden airstream to the second three-way valve in the first absorption bed position, and
wherein the first three-way valve is configured to fluidly connect the carbon dioxide laden airstream to the third three-way valve in the second absorption bed position.

6. The swing bed absorption apparatus of claim 5, wherein the second three-way valve is configured to fluidly connect the first three-way valve to the first absorption bed in the first absorption bed absorption position, and
wherein the second three-way valve is configured to fluidly connect the first absorption bed to the drum inlet passage in the first absorption bed desorption position.

7. The swing bed absorption apparatus of claim 5, wherein the third three-way valve is configured to fluidly connect the first three-way valve to the second absorption bed in the second absorption bed absorption position, and
wherein the third three-way valve is configured to fluidly connect the second absorption bed to the drum inlet passage in the second absorption bed desorption position.

8. The swing bed absorption apparatus of claim 5, further comprising:
a fourth three-way valve configured to switch between a first absorption bed solvent side position and a second absorption bed solvent side position;
a fifth three-way valve configured to switch between a first absorption bed absorption solvent side position and a first absorption bed desorption solvent side position; and
a sixth three-way valve configured to switch between a second absorption bed absorption solvent side position and a second absorption bed desorption solvent side position,
wherein the fourth three-way valve is configured to fluidly connect the solvent pump to the fifth three-way valve in the first absorption bed solvent side position, and
wherein the fourth three-way valve is configured to fluidly connect the solvent pump to the sixth three-way valve in the second absorption bed solvent side position.

9. The swing bed absorption apparatus of claim 8, wherein the fifth three-way valve is configured to fluidly connect a purified stream blower to the first absorption bed in the first absorption bed absorption solvent side position, and
wherein the fifth three-way valve is configured to fluidly connect the first absorption bed to the fourth three-way valve in the first absorption bed desorption solvent side position.

10. The swing bed absorption apparatus of claim 8, wherein the sixth three-way valve is configured to fluidly connect a purified stream blower to the second absorption bed in the second absorption bed absorption solvent side position, and
wherein the sixth three-way valve is configured to fluidly connect the second absorption bed to the fourth three-way valve in the second absorption bed desorption solvent side position.

11. The swing bed absorption apparatus of claim 1, wherein the liquid solvent has a solubility for the carbon dioxide equal to or greater than 3.6 liters of the carbon dioxide per liter of the liquid solvent (0.95 gallons of the carbon dioxide per gallon of the liquid solvent).

12. The swing bed absorption apparatus of claim 1, wherein the liquid solvent is dimethyl ether of polyethylene glycol.

13. A method of removing carbon dioxide from a carbon dioxide laden airstream, the method comprising:
flowing the carbon dioxide laden airstream through a first absorption bed comprising a first plurality of solid amine based sorbent beads configured to absorb the carbon dioxide from the carbon dioxide laden airstream;
ceasing flow of the carbon dioxide laden airstream through the first absorption bed; and
flowing liquid solvent through the first absorption bed when flow of the carbon dioxide laden airstream through the first absorption bed has ceased,
wherein the liquid solvent is configured to desorb the carbon dioxide from the first plurality of solid amine based sorbent beads.

14. The method of claim 13, further comprising:
flowing the carbon dioxide laden airstream through a second absorption bed when flow of the carbon dioxide laden airstream through the first absorption bed has ceased, the second absorption bed comprising a second plurality of solid amine based sorbent beads configured to absorb the carbon dioxide from the carbon dioxide laden airstream.

15. The method of claim 14, further comprising:
ceasing flow of the liquid solvent through the first absorption bed;
ceasing flow of the carbon dioxide laden airstream through the second absorption bed when flow of the liquid solvent through the first absorption bed has ceased; and
flowing liquid solvent through the second absorption bed when the flow of the carbon dioxide laden airstream through the second absorption bed has ceased, wherein the liquid solvent is configured to desorb the carbon dioxide from the second plurality of solid amine based sorbent beads.

16. The method of claim 15, further comprising:
flowing the carbon dioxide laden airstream through the first absorption bed when flow of the liquid solvent through the first absorption bed has ceased and when the flow of the carbon dioxide laden airstream through the second absorption bed has ceased.

17. The method of claim 13, further comprising:
separating the carbon dioxide from the liquid solvent using a flash drum; and
removing the carbon dioxide from the flash drum.

18. The method of claim 13, wherein the liquid solvent has a solubility for the carbon dioxide equal to or greater than 2 liters of the carbon dioxide per liter of the liquid solvent (0.52 gallons of the carbon dioxide per gallon of the liquid solvent).

19. The method of claim 13, wherein the liquid solvent is dimethyl ether of polyethylene glycol.

20. A computer program product tangibly embodied on a non-transitory computer readable medium, the computer program product including instructions that, when executed by a processor, cause the processor to perform operations comprising:
- controlling one or more valves to a flow a carbon dioxide laden airstream through a first absorption bed comprising a first plurality of solid amine based sorbent beads configured to absorb carbon dioxide from the carbon dioxide laden airstream;
- controlling the one or more valves to cease the flow of the carbon dioxide laden airstream through the first absorption bed; and
- controlling another one or more valves to flow liquid solvent through the first absorption bed when the flow of the carbon dioxide laden airstream through the first absorption bed has ceased,
- wherein the liquid solvent is configured to desorb the carbon dioxide from the first plurality of solid amine based sorbent beads.

\* \* \* \* \*